United States Patent [19]

Newberg

[11] Patent Number: 4,882,510

[45] Date of Patent: Nov. 21, 1989

[54] MOTOR COOLING AND PARTICULATE TRAPPING STRUCTURE

[75] Inventor: Barry M. Newberg, St. Louis County, Mo.

[73] Assignee: Emerson Electric Co., St. Louis, Mo.

[21] Appl. No.: 229,923

[22] Filed: Aug. 8, 1988

[51] Int. Cl.<sup>4</sup> .......................... H02K 9/00; H02K 9/06
[52] U.S. Cl. ........................................ 310/63; 310/62; 310/88
[58] Field of Search ............................... 310/62, 63, 88

[56] References Cited

U.S. PATENT DOCUMENTS 1,271,438 7/1918 Cook ..................................... 310/62

FOREIGN PATENT DOCUMENTS 2448522 5/1975 Fed. Rep. of Germany ........ 310/88
2193382 2/1988 United Kingdom .................. 310/62

Primary Examiner—Patrick R. Salce
Assistant Examiner—Tien M. Nguyen
Attorney, Agent, or Firm—Polster, Polster and Lucchesi

[57] ABSTRACT

In an electric motor having a stator with end turn windings on opposed faces thereof and a rotor and shaft extending through the stator, an improved motor cooling arrangement including a baffled cage-like fan separately and proximally surrounding the end turns on one face of the stator and a particulate trap mounted on the shaft in cooperation with the baffled cage-like fan.

7 Claims, 3 Drawing Sheets

U.S. Patent   Nov. 21, 1989   Sheet 3 of 3   4,882,510
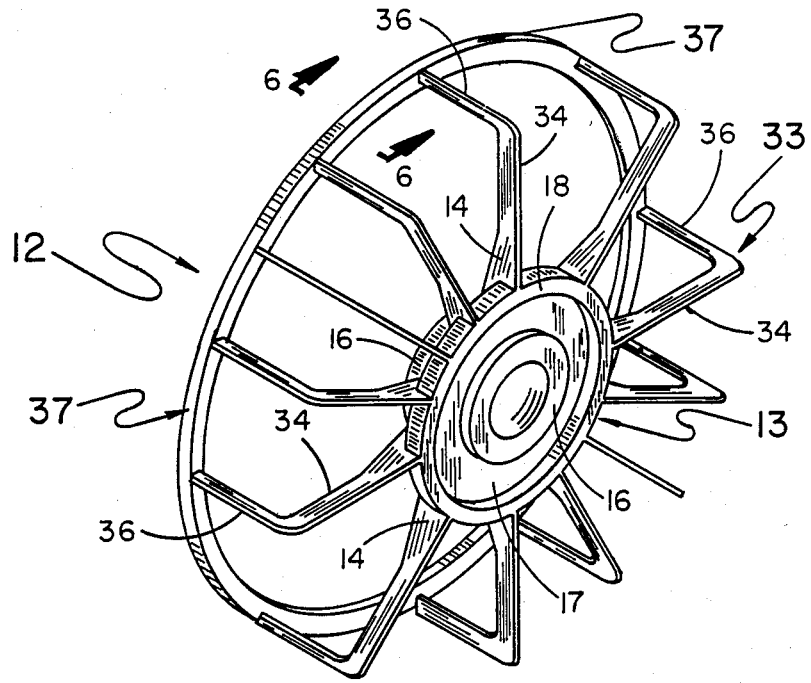
FIG. 4
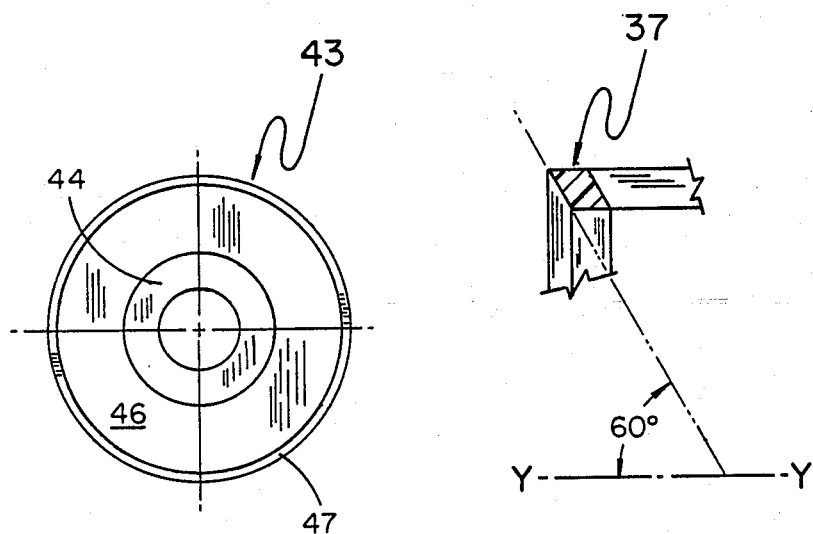
FIG. 5
FIG. 6

MOTOR COOLING AND PARTICULATE TRAPPING STRUCTURE

BACKGROUND OF THE INVENTION

The present invention relates to electric motors and more particularly to electric motors of the type exposed to ambient entrained particulate materials, such as those motors used with laundry drying machines which are exposed to ambient conditions including immoderate quantities of clothing lint.

It is generally well known in the electric motor art to provide some type of fan assembly within the motor frame structure to cool the windings of the motor by blowing an air stream thereover during motor operations. It also is known to provide external traps on the motor frame structure to stop ambient entrained particulate materials from entering into the motor where such materials reduce motor cooling and operational efficiency and ultimately reduce overall motor life. One such structural arrangement for a motor can be found in U.S. Pat. No. 3,916,232, issued to Michael R. Barone on Oct. 28, 1975. This patent discloses two cooperative sets of metallic annularly disposed vanes which are generally parallel to each other and which are incorporated as part of the rotor itself, one set of the vanes being part of at least one of the rotor end rings and the other set being formed from an annulus secured to the ends of the vanes of the set formed form the rotor end rings.

The present invention recognizes that the prior art motor cooling assemblies have been comparatively expensive in both manufacture and assembly and have presented problems in operation and maintenance, limiting the motor life expectancy through undesirable build-up in the motor parts of particulate matters such as lint, which lint not only absorbs some of the motor lubricant required for desirable bearing performance but also covers portions of the windings to create a heat transfer barrier to the air cooling stream passed thereover.

The present invention, recognizing these aforementioned problems with prior art structures, teaches a unique, novel, comparatively inexpensive to manufacture, assemble and maintain motor cooling and particulate trapping structure, providing for a substantially improved air flow cooling stream which passes over the peripheral surface of a motor stator and end turns and exiting in radially outward fashion away from such stator and end turns. Further, the novel structure of the present invention serves to minimize particulate accumulation at select labyrinth formed areas of the motor, thus reducing oil loss and undesirable blanketing of motor parts with its concomitant reduction of heat transfer function. Not only does the structure of the present invention provide a comparatively improved motor cooling effect along with reduced problems of particulate contamination, but, in addition, the structure of the present invention allows this to be accomplished through either an inexpensive to manufacture and easy to assemble and maintain, integral, unitary arrangement or through one or two separate units which can be proximally positioned to achieve similarly desirable results—the particular arrangement to be utilized depending upon the nature of the environment with which the motor is to be confronted.

Various other features of the inventive structure disclosed herein will become obvious to one skilled in the art upon reading the disclosure herein.

SUMMARY OF THE INVENTION

More particularly, the present invention provides in an electric motor frame structure containing a stator with a stack of laminated plates having a plurality of windings extending therethrough in looped fashion to form end turns on opposed faces thereof and a rotor mounted on a rotor shaft to extend through the stator for rotation within the stator, an improved motor cooling structure comprising: a separate annular central hub member preselectively sized to be mounted in position on the rotor shaft adjacent one end of the stator; and, a plurality of spaced vane members arranged to form a separate cage-like fan rotatably surrounding the end turns along one face of the stator, each vane member including a first section extending in fixed radial fashion from the central hub member proximally spaced from the end turns on the face of the stator and a second section extending substantially normal from the first section proximally spaced from the outer peripheral surface of the end turns so that the first and second sections provide the separate cage-like fan rotatably surrounding the end turns of the stator to blow a cooling flowing air stream thereover. In addition, the present invention provides, either as an integral part of the central hub member or as a separate unit or two separate proximal units, each including its own central hub mounting portion, a particulate trap member mounted on the rotor shaft either alone or in proximal cooperation with the vanes of a fan, the particulate trap member being in the form of an annular open-ended labyrinth forming cup-like member to trap particulates in the cooling air stream to prevent them from carrying over to the stator, the rotor and the lubrication system therefor. Further, the present invention provides a baffle ring mounted on the second sections of the spaced vanes of the cagelike fan, advantageously at the extremities thereof, the baffle ring insuring fan stability and serving to form a shaped duct between the ring and the radially extending first sections of the fan to provide an air flow cooling stream. This air cooling stream passes over the peripheral surfaces of the motor stator and the end turns and then exits in radially outward fashion through the spaces between the second sections of the cage-like fan.

It is to be understood that various changes can be made by one skilled in the art in one or more of the several parts of the structural arrangement disclosed herein without departing from the scope or spirit of the present invention. For example, changes can be made by one skilled in the art in the vane shape and in the particulate labyrinth forming cup shape in accordance with the environmental demands to be confronted.

BRIEF DESCRIPTION OF THE DRAWINGS

Referring to the drawings which disclose one advantageous embodiment of the present invention and a modification thereof:

FIG. 4 is an isometric view of the cage-like fan assembly of FIGS. 1, 2, and 3 disclosing an integral particulate trapping member;

FIG. 5 is a front end view of a modified arrangement wherein the particulate trapping member including the labyrinth is disclosed as a separate unit without the cage-like fan assembly; and, FIG. 6 is an enlarged cross-sectional view taken in plane 6—6 through a portion of the baffle of FIG. 4 serving to disclose the slope of the inner face of the fan baffle ring relative the fan axis of rotation.

DETAILED DESCRIPTION OF THE DRAWINGS

Figure 1:
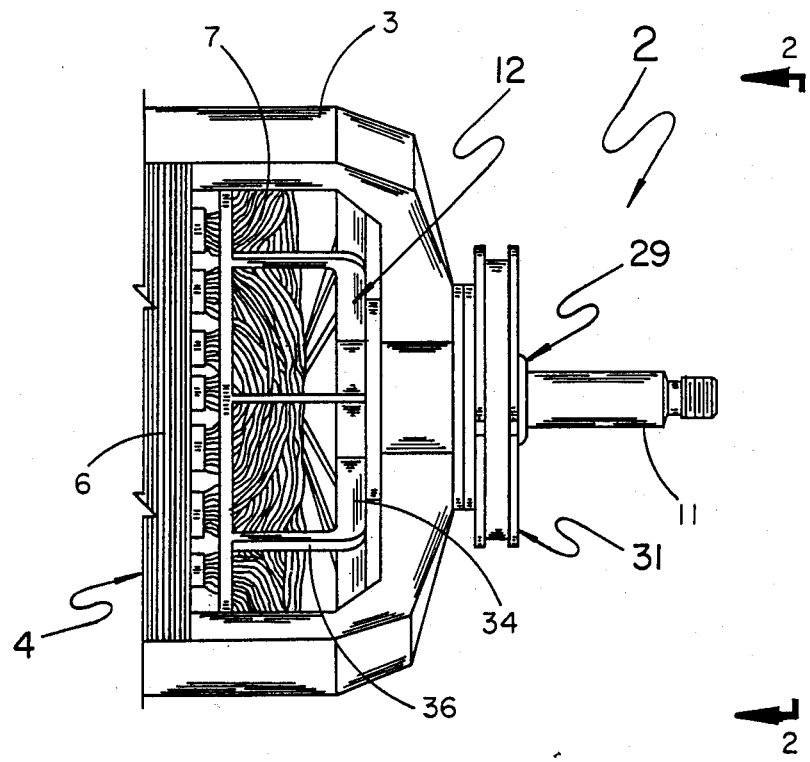
FIG. 1 is a partially broken away side view of an electric motor incorporating one embodiment of the inventive structure of the present invention.
Figure 2:
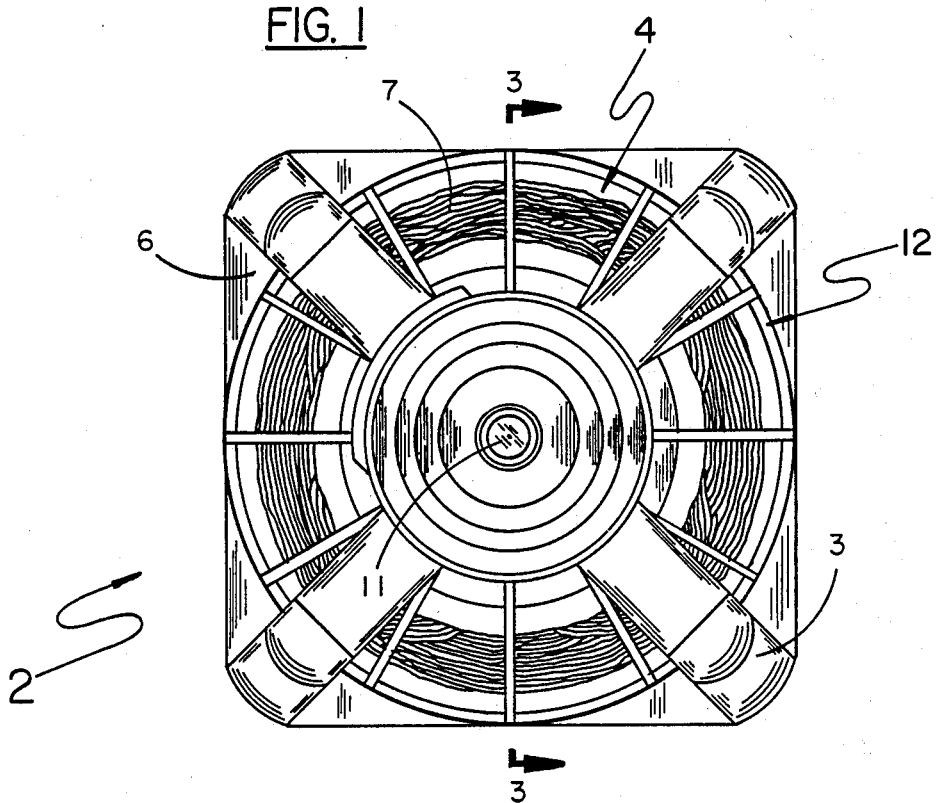
FIG. 2 is an end view of the motor of FIG. 1 taken in a plane through line, 2—2 of FIG. 1.
Figure 3:
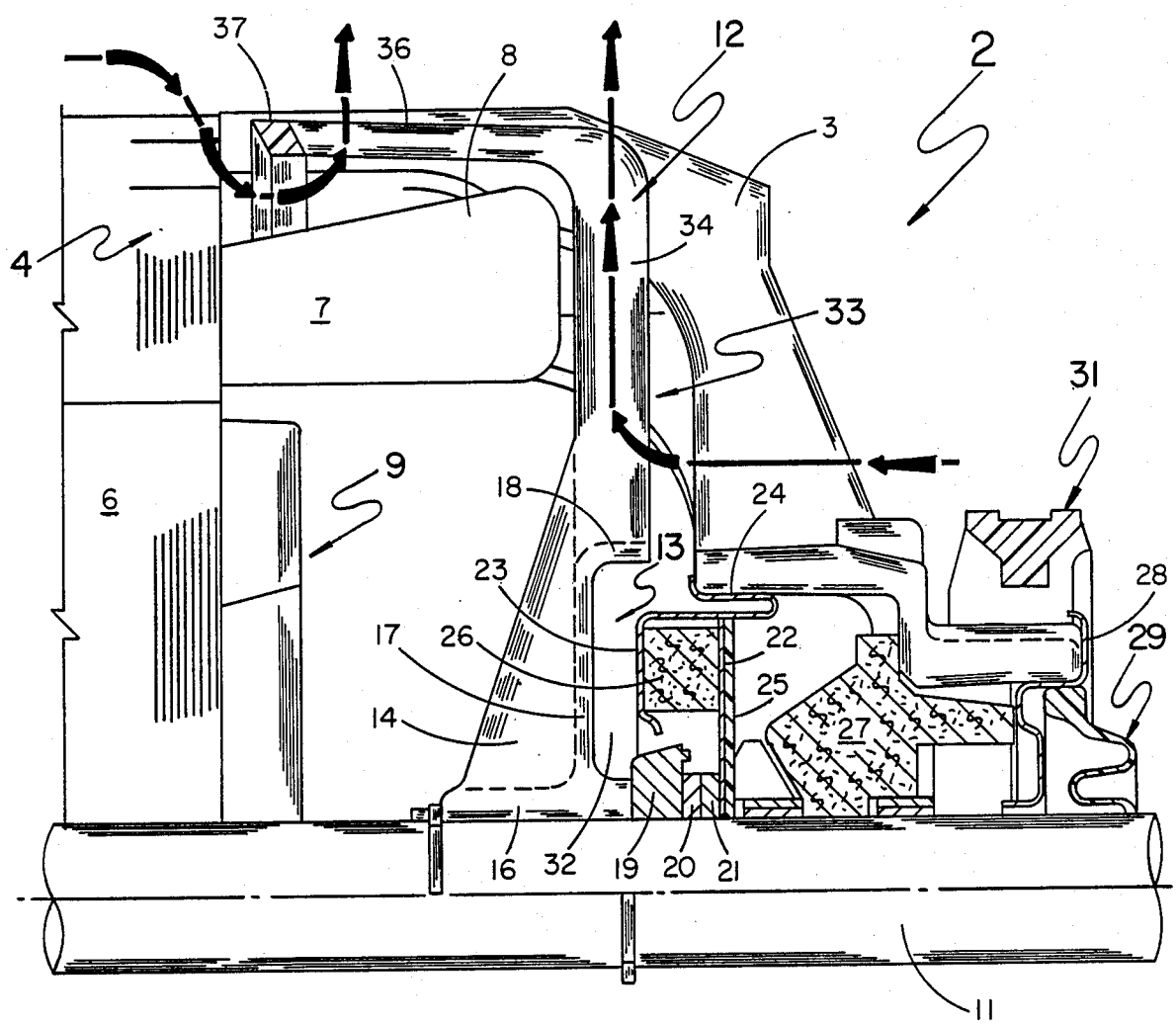
FIG. 3 is a cross-sectional view of the structure of FIG. 1 taken in a plane through line 3—3 of FIG. 2.

As can be seen in FIGS. 1, 2, and 3 of the drawings, the inventive electric motor 2 is disclosed. Motor 2 in this instance is designed for use with a domestic clothing dryer where inordinate quantities of particulate materials in the form of lint are present, but it is to be understood that the present invention can be utilized with other motor types as well.

Motor 2 includes a suitably molded or cast motor frame structure 3 in which is disposed a stator 4 having a stack of laminations 6 through which electrical windings 7 extend in annularly looped fashion to form end turns 8 on opposed faces thereof. A rotor 9 mounted on a rotor shaft 11 extends through stator 4 for rotation within the stator—all in a manner generally known in the art of electric motors.

In accordance with the present invention, a separate integrally formed cage-like fan structure 12 is disclosed in FIG. 4 of the drawings to include a particulate trap member 13 formed therewith. This cage-like fan structure 12 can be seen in FIGS. 1, 2, and 3 of the drawings in assembled, functional relation with the other motor parts where it serves to provide—as disclosed by the flow arrows—an air flow cooling stream which passes over the outer peripheral surface of the motor stator 4 and end turns 8 to exit radially outward through the spaces between the trailing section of the vanes of the cage-like fan. In this regard, fan 12 can be formed from any one of a number of comparatively inexpensive, suitable lightweight materials which are easy to mold, assemble and maintain, such as one of several suitably strong, substantially rigid, reinforced plastics. For example, a molded glass-filled nylon has been found to be appropriate for this purpose.

As can be seen in FIGS. 1-4, cage-like fan 12 includes an annular central hub member 14 having a shaft mounting portion 16 preselectively sized to be mounted in a suitable fashion such as but not limited to being press-fit in firm relation on rotor shaft 11 adjacent one end of stator 4. Hub member 14 includes a gas impervious central annular disc 17 of preselected diameter, disc 17 extending radially from shaft mounting portion 16. An outer peripheral rim 18 extends normally from disc 17 in an upstream direction to form labyrinth 32 between upstream structure and particulate trap member 13 in fan 12. As can be seen more readily in FIG. 3 of the drawings, particulate trap member 13 is positioned downstream and adjacent a thrust retainer 19 mounted on shaft 11 which, with upstream annular rubber and phenolic thrust washers 20 and 21 respectively mounted on shaft 11, serve to control axial movement of the rotor assembly. To further control the axial thrust load of the rotor assembly, annular thrust plate 22 is provided along with an annular felt lubricating washer 25. An annular bearing cap 23 having a peripheral, resilient U-shaped rim 24 which engages in snap-fit relation on the frame superstructure 3 between the periphery of plates 22 and frame 3 serving to retain an annular felt lubricating reservoir 26 between it and thrust plate 22. An appropriately shaped oil wick 27 is positioned upstream thrust plate 22, wick 27 being retained in position by motor frame structure 3 and another appropriately sized annular bearing cap 28 which engages with motor frame 3. Nesting with this bearing cap 28 and surrounding shaft 11 is an outer lint seal 29. Suitable mounting ring assemblies 31 for motor 2 are splined on their inner peripheries and dovetailed with appropriately sized splines at opposite ends of frame structure 3.

In accordance with the present invention and particularly as can be seen in FIG. 3 of the drawings, particulate materials such as lint particles which infiltrate into the motor migrate as far as labyrinth 32 which forms the space between trap members 13 and bearing cap 23 downstream the annular thrust plate 22 to impinge against gas impervious annular disc 17 of particulate trap member 13 to be arrested from further movement in the blown air stream and from entering into the lubricating system.

To move the cooling air stream in a suitable fashion over the stator 4, a plurality of equally spaced fan vanes 33 are provided to extend radially from the outer periphery of rim 18 of the aforedescribed particulate trap member 13. Each vane member 33 includes a first flat rib section 34 which extends in integral, fixed radial fashion from the outer surface of peripheral rim 18 with the trailing edge thereof proximally spaced from end turns 8. A second section 36 integral with the first section 34 extends substantially normal from the first section in a downstream fashion in proximally spaced relation with the outer peripheral surfaces of the end turns. Each of sections 36 advantageously is tapered slightly in cross-sectional thickness toward the downstream extremity thereof. The extremity of each second section 36 is integrally fixed to an annular baffle ring 37 which, like sections 36, of which it is a part, is positioned in spaced proximal relation to the outer peripheral surface of end turns 8 and to stator 4. It is to be noted that the inner, downstream surface of baffle ring 37 can be sloped at an angle of approximately 60 degrees with respect to the axis of rotation (Y—Y) of rotor shaft 11 (FIG. 6). This baffle ring 37 not only serves to add stability to cage-like fan 12, but also serves to further insure that the air flow cooling stream passes over the outer surfaces of stator 4 and end turns 8 to exit radially outward through the spaces between trailing, downstream second sections 36 of cage-like fan 12.

Referring to FIG. 5 of the drawings, a particulate trap member 43 similar in construction to the aforedescribed trap member 13 is shown as a separate unit. Trap member 43 in the form of a central hub has a mounting portion 44 preselectively sized to be mounted on shaft 11. An annular upstream open-ended labyrinth forming cup-like member is provided like trap 13 in the form of an annular gas-impervious disc 46 extending from mounting portion 44 and having a normally extending particulate trapping rim 47 to complete the desired labyrinth forming cup-like particulate trap.

The invention claimed is:

1. In an electric motor frame structure containing a stator with a stack of laminated plates having a plurality of windings extending therethrough in looped fashion to form end turns on opposed faces thereof, a rotor mounted on a rotor shaft to extend through said stator for rotation within said stator, and a lubricating system upstream thereof, an improved motor cooling structure comprising:

a separate, annular central hub member having a shaft mounting portion preselectively sized to be independently mounted on said rotor shaft adjacent one end of said stator; and, a plurality of spaced vane members arranged to form a separate cage-like fan circumferentially and rotatably surrounding said end turns of said stator along one face of said stator, each vane member including a first section extending in fixed radial fashion from said central hub member proximally spaced in direct, uninterrupted fashion from said end turns on said face of said stator and a second section extending substantially normal from said first section proximally spaced in direct, uninterrupted fashion from the outer peripheral surfaces of said end turns so that said first and second sections provide said separate cagelike fan rotatably and circumferentially surrounding said end turns of said stator to blow in laminar fashion a cooling air stream over the face and over the outer peripheral surfaces of said end turns.

2. The improved motor cooling structure of claim 1, said second sections of said vane members having an annular baffle ring fixed to the respective sections in spaced relation to the outer peripheral surface of said end turns to form a shaped duct between said baffle ring and said radially extending first sections of said cage-like fan to provide an air flow cooling stream passing over the peripheral surface of said motor stator and said end turns to exit in radially outward fashion through the spaces between said second sections of said cage-like fan.

3. The improved motor cooling structure of claim 1, said central hub member and said spaced vane members being integrally formed from the same material.

4. The improved motor cooling structure of claim 1, said central hub member and said spaced vane members being integrally formed from a suitable preselected rigid plastic material.

5. The improved motor cooling structure of claim 1, said central hub member including an annular open-ended labyrinth forming cup-like member extending radially between said radially extending first sections of said vane members and said shaft mounting portion thereof to form a labyrinth and particulate trap member to trap particulates in the air stream preventing such trapped particulates from carrying over to said stator, rotor and lubricating system.

6. The improved motor cooling structure of claim 5, said annular cup-like member serving to form a labyrinth within the motor frame structure with the motor structure proximally upstream thereof.

7. In an electric motor frame structure containing a stator with a stack of laminated plates having a plurality of windings extending therethrough in looped fashion to form end turns on opposed faces thereof and a rotor mounted on a rotor shaft to extend through said stator for rotation with said stator, an improved motor cooling assembly comprising:

a separate integrally formed plastic cage-like fan and labyrinth forming particulate trap member including an annular central hub member having a shaft mounting portion preselectively sized to be independently mounted on said rotor shaft adjacent one end of said stator;

said central hub member including a gas-impervious annular disc extending radially from said shaft mounting portion of said central hub, said disc having an outer peripheral rim extending normal thereto in an upstream direction to form said particulate trap member;

a plurality of spaced vane members extending radially from the outer surface of said peripheral rim to form a separate cage-like fan circumferentially and rotatably surrounding said end turns of said stator along one face of said stator, each vane member including a first flat rib section extending in fixed radial fashion from the outer surface of said peripheral rim with the trailing edges thereof proximally spaced in direct, uninterrupted fashion from said end turns on said face of said stator and a second section extending substantially normal from said first section with said second section being proximally spaced in direct, uninterrupted fashion from the outer peripheral surfaces of said end turns;

each of said second sections tapering slightly in cross-sectional thickness toward their extremities and each being integrally fixed at their extremities to an annular baffle ring in spaced proximal relation to the outer peripheral surface of said end turns with the inner surface of said ring sloping at an angle of approximately 60 degrees to the axis of rotation of said rotor shaft to form a shaped duct between said baffle ring and said radially extending first sections of said cage-like fan so as to provide an air flow cooling stream which passes over the outer peripheral surfaces of said motor stator and said end turns to exit radially outward through the spaces between said second sections of said cage-like fan.

* * * * *